Sept. 5, 1961 H. VORGAN 2,999,134

AUTOMATIC STATION SELECTED INDICATOR FOR REMOTE CONTROLLED TELEVISION RECEIVERS

Filed July 13, 1960 2 Sheets-Sheet 1

Harry Vorgan,
*INVENTOR.*

*BY.*

[signature]

*ATTORNEY.*

Harry Vorgan,
INVENTOR.
BY.
Billy A. Robbins
ATTORNEY

United States Patent Office 2,999,134

Patented Sept. 5, 1961

2,999,134

AUTOMATIC STATION SELECTED INDICATOR FOR REMOTE CONTROLLED TELEVISION RECEIVERS

Harry Vorgan, 1252 S. Rimpan Blvd., Los Angeles, Calif.

Filed July 13, 1960, Ser. No. 42,532
10 Claims. (Cl. 179—100.1)

This invention relates to remote control television receivers and more particularly to electronic apparatus for use in conjunction with such receivers for automatically indicating the particular television station which has been selected for reception each time the television station to be received is remotely changed.

In using prior art remotely controlled television receivers it has been the practice to determine visually the station selected after each actuation of a remote control station selector switch. Such practices necessitate directly approaching the receiver or first determining which station the television receiver is tuned to receive and then counting as stations are changed to ascertain the exact station selected with the remote control unit.

In each of the foregoing instances the particular practice involved is undesirable and uncomfortable to the viewer and lessens the desirability of utilizing remote control devices with television receivers.

It is, therefore, an object of the present invention to provide an apparatus for electronically indicating the particular television station which has been selected by utilization of a remote control unit used in conjunction with a television receiver.

It is another object of the present invention to provide an apparatus which provides the listener with an audible indication of the particular station selected by utilization of a remote control unit with a television receiver.

It is another object of the present invention to provide an apparatus for electronically and audibly indicating a particular television station which has been selected which is simple and rugged and may be incorporated into any remotely controlled television receiver.

It is another object of the present invention to provide an apparatus for use in conjunction with a remotely controlled television receiver which enhances the utilization of remote control apparatus with television receivers.

Other and more specific objects and advantages of the present invention will become apparent from a reading of the following description taken in conjunction with the accompanying drawings which are presented by way of example only, and are not intended as a limitation upon the scope of the present invention as defined in the appended claims, and in which:

An electronic channel indicating apparatus in accordance with the present invention includes a medium containing a plurality of pre-recorded messages each of which coincides with a particular television station which may be selected by a remote control unit used in conjunction with a television receiver. Means is provided for selectively reproducing a predetermined one of the prerecorded plurality of messages in accordance with the particular television station which has been selected for viewing. Means is provided for amplifying the reproduced message and for applying it to the television speaker to thereby audibly indicate to the viewer the channel or television station selected for viewing by utilization of the remote control unit in conjunction with the television receiver.

In accordance with one specific configuration of one embodiment of the invention, there is provided a plurality of messages which are pre-recorded upon a continuous loop magnetic tape. A reproducing head is provided for each of the pre-recorded messages. A rotary switch is interconnected with the channel selector switch of a television receiver for selectively choosing a predetermined one of the reproducing heads in accordance with the particular channel which is selected. Means is provided for driving the tapes and for controlling the tape drive mechanism so that it is in operation only for a predetermined period of time immediately following the initial selection of a particular station for viewing. The output of the tape head which has been selected is applied to a preamplifier and from there through the contacts of a relay, which is energized only during the time the prerecorded message is being applied to the television audio amplifier and from there into the television speaker.

Figure 1:
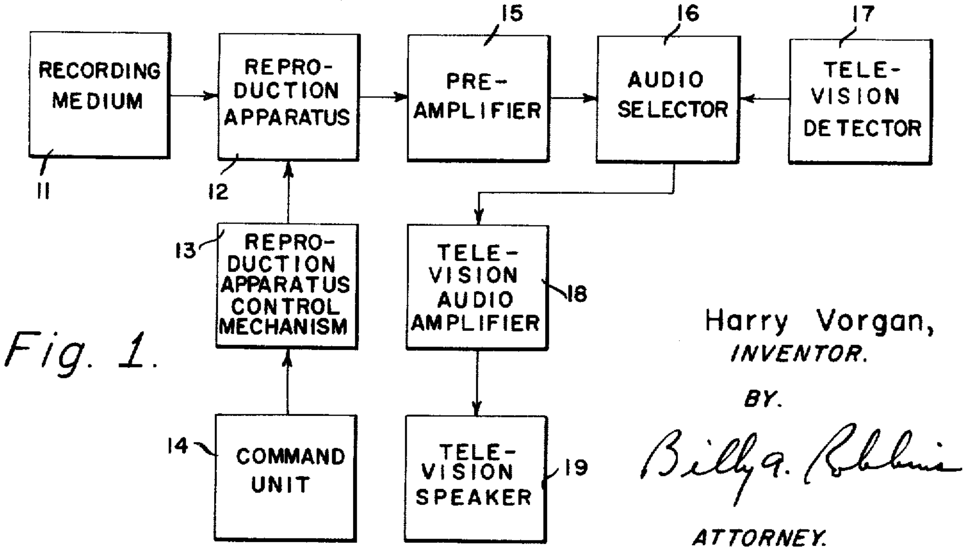
FIG. 1 is a schematic diagram, in block form, of an electronic station selected indicator incorporated into a remote control television receiver in accordance with the present invention.

Referring now to the drawings and more particularly to FIG. 1 thereof, a block diagram illustrating the channel indicating apparatus in accordance with the present invention as it is incorporated into a portion of a television receiver is illustrated. As is therein shown, a recording medum 11 is utilized and has pre-recorded thereon a plurality of messages, each of which coincides with a particular station which may be selected for viewing within a particular area. For example, the words "Channel 2," "Channel 2," "Channel 2" may be prerecorded upon one portion of the recording medium, while the words "Channel 4," "Channel 4," "Channel 4" may be pre-recorded upon a separate and distinct portion of the recording medium. The recording medium may be any particular type which is desired such as a wire, disk, magnetic tape, or the like. Preferably, however, in accordance with the present invention a continuous loop of magnetic recording tape is utilized. Mechanically and electrically interconnected with the recording medium containing the plurality of pre-recorded messages is a reproduction apparatus 12. Obviously the reproduction apparatus will be chosen in accordance with the particular type recording medium utilized in any particular application in accordance with the present invention. For example, when a continuous loop magnetic tape is utilized as the recording medium, a magnetic tape reproducing head is utilized. As will be apparent to those skilled in the art, a tape head for each pre-recorded message upon the recording medium may be utilized or means may be provided for mechanically shifting a single tape head from one section of the pre-recorded tape to another in accordance wth the particular channel which has been selected.

A reproduction apparatus control mechanism 13 is interconnected with the reproduction apparatus 12 in order to control its operation so that a predetermined one of the pre-recorded messages will be heard by the viewer only at a particular time, specifically, after he has selected a station for viewing. The specific operation of such a control mechanism will be discussed more fully below. A command unit 14 is interconnected with the reproduction apparatus control mechanism 13 in order to initiate actuation of the reproduction apparatus control mechanism and thus the reproduction of a predetermined pre-recorded message.

The output of the reproduction apparatus 12 is applied in some instances to a preamplifier 15. If the output of the reproduction apparatus is of sufficient magnitude it may be applied directly to the amplifier contained within the television receiver. However, it has been found that in most instances the output of the reproduction apparatus is of insufficient magnitude for such application and therefore requires a preamplifier. The output of the preamplifier is applied to an audio selector 16. Under normal operational conditions of the television receiver, that is when no station change has occurred, the output of the audio section of the television signal is applied through the audio selector from the television detector 17 to the remaining section of the television receiver such as, for example, the television audio amplifier 18 and the television speaker 19. Under these conditions the audio portion and the video portion of the picture remain intact and are viewed and heard by the listener. However, when the listener changes stations the audio selector operations to remove the audio portion of the television signal and to apply the selectively reproduced pre-recorded message to the television audio amplifier 18 and television speaker 19. In this manner the viewer of the television receiver is audibly informed of the particular television station which he has selected for viewing by actuating his remote control unit. In this manner the listener may remain seated in his chair and know which station has been selected for viewing.

Figures 2, 3:
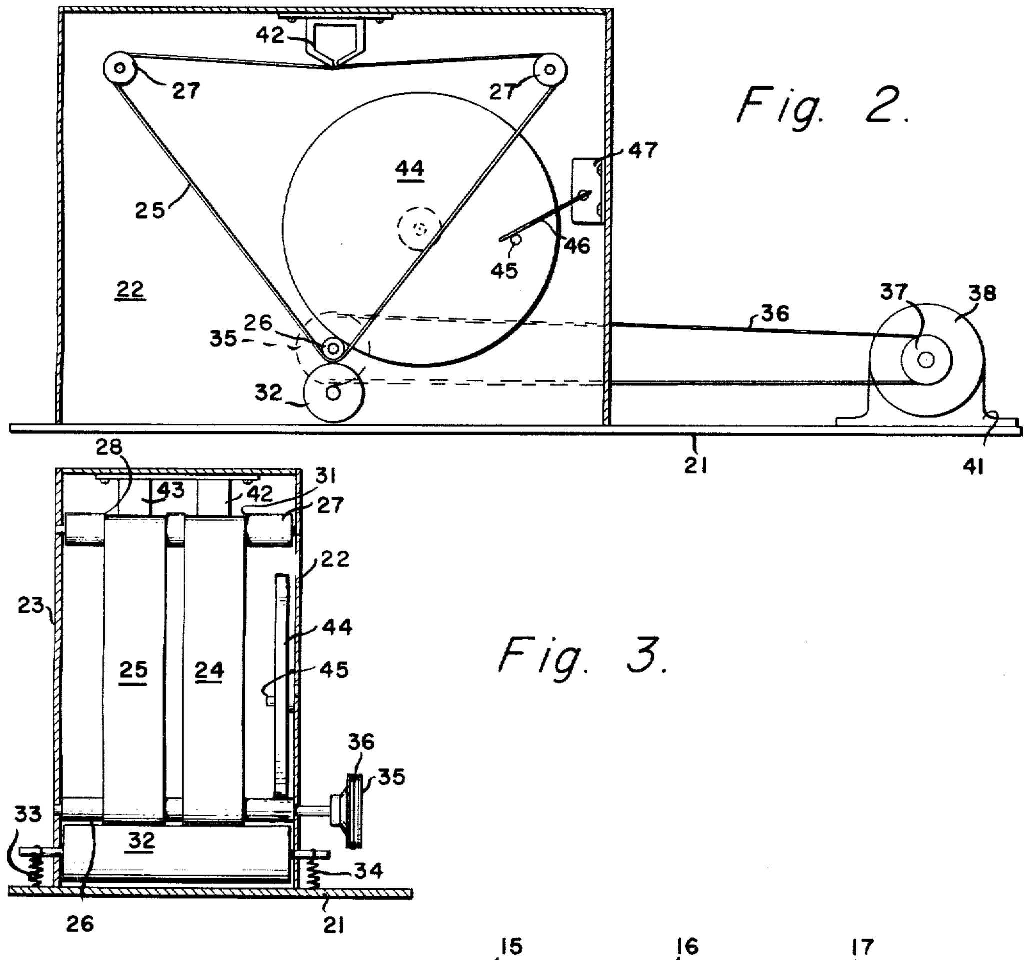
FIG. 2 is a side elevation of one apparatus which may be used in conjunction with the electronic channel indicating unit in accordance with the present invention.
FIG. 3 is an end elevational view, partly in cross-section, of the apparatus of FIG. 2.

By referring to FIGS. 2 and 3, one particular apparatus, which may be utilized for containing a plurality of pre-recorded messages and for reproducing a selective one of these messages, is illustrated. As is therein illustrated, there is provided a base 21 having a frame including a pair of upstanding side portions 22 and 23. A pair of continuous loop magnetic tapes 24 and 25, each having a predetermined number of pre-recorded messages contained thereon, are looped about a drive roller 26 and a tape guide 27. Although in the preferred embodiment of the present invention there is illustrated a pair of magnetic tapes 24 and 25, it should be understood that one single tape may be utilized or alternatively a single tape for each pre-recorded message may be utilized. The drive roller 26 is journalled between the upstanding side portions 22 and 23 of the apparatus and the tape guide 27 is affixed between the upstanding side portions 22 and 23. Recesses 28 and 31 are provided in the tape guide 27 in order to retain the pre-recorded continuous loop tapes within a particular position. A pressure roller 32 is inserted within the upstanding side members 22 and 23 and is retained in place by pressure exerting members such as springs 33 and 34 in order to exert positive contact between the drive roller 26 and each of the tapes 24 and 25 during the time that the apparatus is in operation to thereby insure that the tapes move positively and evenly past the recording heads. A pulley 35 is affixed to one end of the drive roller 26 in order to apply a driving force to the tapes 24 and 25 at the predetermined desired time. A belt 36 is interconnected between the pulley 35 and an additional pulley 37 which is affixed to the drive shaft of a motor 38 which is mounted by way of a motor base 41 upon the base 21 of the apparatus. Tape heads 42 and 43 are retained in place upon the frame in any desired manner known to the art. When two tapes, such as illustrated at 24 and 25 in FIG. 3, are utilized in an area which is capable of receiving, for example, eight television stations, each of the tapes will have pre-recorded thereon four separate and distinct messages relating to one of the particular stations which may be received. If two separate tape heads such as illustrated at 42 and 43 are utilized, each of these tape heads will have a separate reproducing section incorporated therein which individually coincides with each of the pre-recorded messages upon each of the tapes. Therefore, by electrically selecting and energizing a particular one of the reproducing sections of one of the tape heads a predetermined one of the pre-recorded messages may be reproduced from one of the tapes 24 and 25. Similarly, a single tape having eight pre-recorded messages contained thereon and a single tape head having eight distinct reproducing heads contained therein may be utilized. However, as above indicated, a tape head having a single reproducing section may be utilized and may be provided with means for shifting the head from one of the pre-recorded messages upon the tape to another in accordance with the particular station which has been selected.

In order to control the amount of time during which a pre-recorded message is audibly introduced over the loudspeaker of the television system, there is provided a timing wheel 44 which is journalled within the upstanding side member 22 of the apparatus. Protruding from the timing wheel 44 is an arm 45 which operates to move a lever 46 which in turn is interconnected with a micro-switch 47. The operation of the micro-switch 47 and the timing wheel 44 will be more fully described hereafter.

The apparatus illustrated in FIGS. 2 and 3 and above described is used in conjunction with a control circuit for selectively reproducing one of the pre-recorded messages and for applying it through the television speaker so that the viewer may determine which of the channels has been selected with the remote control unit. The interconnection and the operation of the control circuit may be ascertained by reference to FIG. 4.

Figure 4:
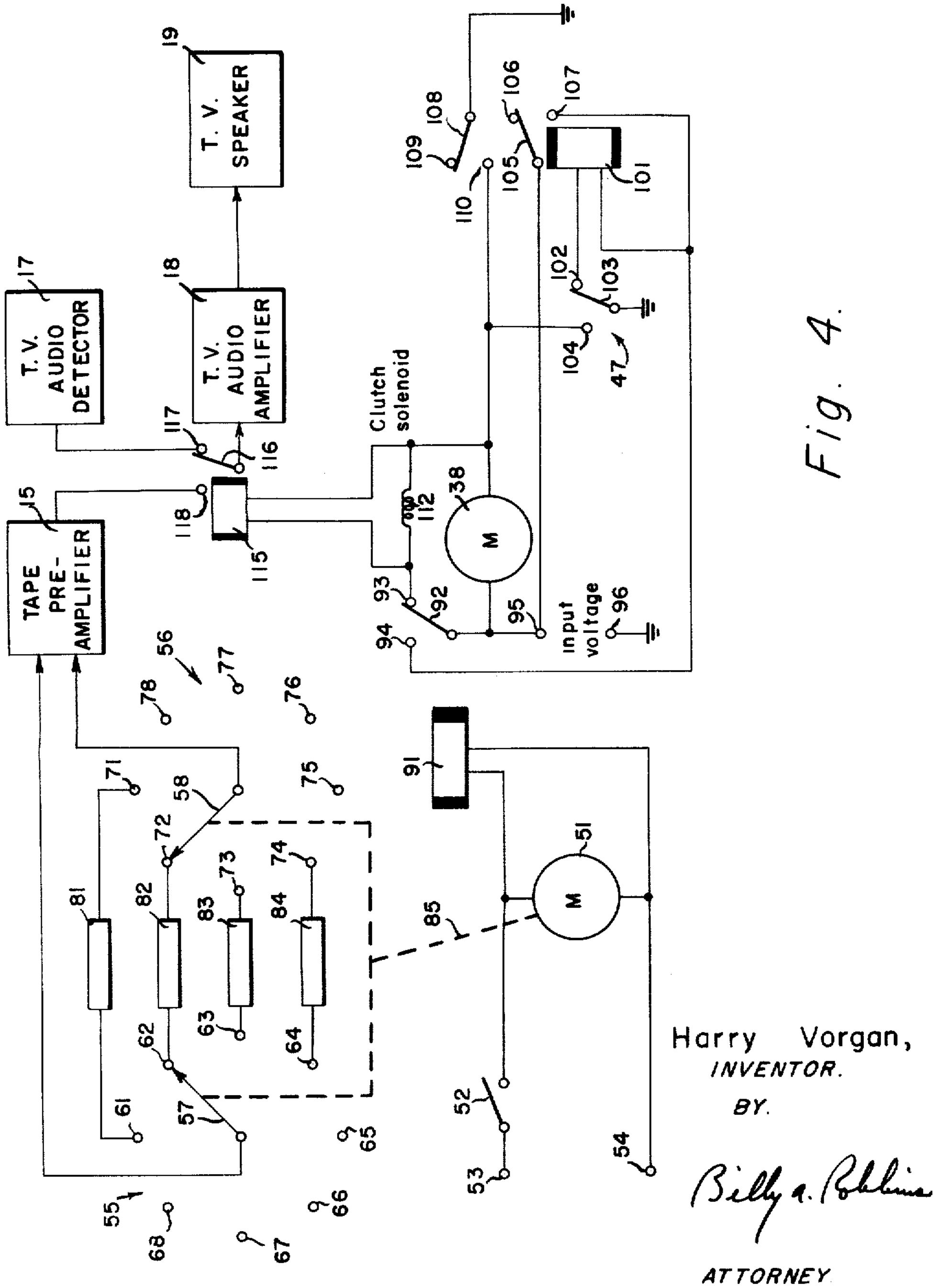
FIG. 4 is a schematic diagram of a control circuit for the electronic channel indicator in accordance with the present invention.

As is illustrated in FIG. 4, a station select motor 51 is utilized in conjunction with the usual hand unit (not shown) for remotely selecting a predetermined channel. The motor 51 is mechanically connected to the channel or station select switch not shown. Power is applied to the motor 51 through a switch 52 which may, for example, be a pair of contacts of a relay which closes when the channel select button on the hand control remote unit is energized. When the switch 52 closes, power is supplied from terminals 53, 54 to the motor 51. Also mechanically connected to the motor 51 is a pair of rotary switches 55, 56 which are synchronized as to position and rotation with the channel select switch (not shown). The mechanical interconnection between the motor 51 and the rotary arms 57 and 58 of the rotary switches 55 and 56 is illustrated by the dashed line 85. Rotary switches 55 and 56 each contain a rotary contact arm 57, 58, respectively. Rotary switch 55 also includes a series of stationary contacts 61 through 68, while rotary switch 56 contains a series of stationary contacts 71 through 78.

The tape pickup heads 81 through 84 are connected between selected pairs of the stationary contacts of the rotary switches 55 and 56. Each of the tape pickup heads are electrically energized in a predetermined fashion to reproduce a preselected one of the pre-recorded messages upon the tapes as above discussed. For example, tape pickup heads 81 through 84 are interconnected between the stationary contacts 61 through 64 of switch 55 and 71 through 74 of switch 56, respectively. Particular stationary contacts are selected to conform to a particular television station. For example, the stationary contacts 61, 71 of switches 55, 56 respectively may be interconnected to channel 2 of a television receiver, while the remaining switches are connected to consecutively numbered channels over which television stations may be received in a particular locality; for example, contacts 62, 72 may be connected to channel 4, while 63, 73 are connected to channel 5 and 64, 74 to channel 7. The remaining contacts of each of the switches are also connected to tape pickup heads which are not shown on the drawing for purposes of clarity of illustration and description.

Connected across the motor 51 is a relay 91. Relay 91 becomes energized only during the time that the station select motor 51 is energized. Relay 91 includes normally closed contacts 92, 93 and an additional contact 94. Contact 92 is connected to one of the input voltage terminals 95, the other terminal 96 of the input voltage terminals being connected to a common point, such as ground. Contact 94 of the relay 91 is connected to a relay 101, the other terminal of relay 101 is connected to normally closed contacts 102, 103 of the microswitch 47. Contact 103 of the microswitch 47 is connected to ground. Relay 101 includes normally open contacts 105, 107 and normally open contacts 108, 110. Contact 105 is connected to input terminal 95, while contact 107 is connected to relay 101. When contacts 105 and 107 of relay 101 are closed, they operate to hold relay 101 in an energized condition for a predetermined period of time. As can be seen, contacts 106 and 109 of relay 101 are not utilized.

As is illustrated, one terminal of the tape drive motor 38 is connected to input voltage terminal 95 while the other is connected to contact 110 of relay 101. A clutch solenoid 112 which operates in conjunction with the tape drive motor 38 is connected to contact 93 of relay 91. Connected across solenoid 112 is a relay 115. Relay 115 includes normally closed contacts 116, 117 and an additional contact 118. As is illustrated, in normal operating conditions, the output of the television audio detector 17 is applied through normally closed contacts 117, 116 of relay 115 to the television audio amplifier 18 and from there to the television speaker 19.

The output of the rotary switches 55, 56, which is the pre-recorded message, is applied to tape preamplifier 15 and from there to contact 118 of relay 115.

For purposes of discussion of the circuit of FIG. 4 in applying a predetermined pre-recorded message to the television speaker it will be presumed that power is applied to terminals 53, 54 and to terminals 95, 96 and that the rotary switches 55, 56 have the rotary contacts thereof in connection with the stationary contacts 61, 71 respectively. It will now be presumed that the viewer actuates the channel select button on the hand unit of the remote control for the television receiver. At this point, the switch 52 closes applying power to motor 51 which in turn causes the station select switch of the television station to move to the next successive station. At he same time, rotary arms 57, 58 are caused to move to stationary contacts 62, 72 respectively, thereby electrically placing tape head 82 in the circuit.

Power is also applied through closed switch 52 from terminals 53, 54 to relay 91 thereby energizing it and causing contacts 92, 94 to close. This applies power from input terminal 95 through closed contacts 92, 94 to relay 101 which in turn causes it to become energized since the other terminal thereof is connected through normally closed contacts 102, 103 of microswitch 47 to ground thus completing the circuit back to grounded terminal 96. When relay 101 energized, contacts 105, 107 become closed thus applying power from terminal 95 to the relay 101 thereby holding it energized irrespective of the condition of relay 91. Contacts 108, 110 also close, thereby applying ground to one terminal of the tape drive motor 38 and to one side of the clutch solenoid 112. Since the other terminal of the tape drive motor 38 is connected to input voltage terminal 95, tape drive motor 38 becomes energized and starts rotating. However, since contacts 92, 93 of relay 91 are now open, the clutch solenoid remains de-energized and thereby the tapes containing the pre-recorded messages remain stationary.

At this point the channel select switch in the television receiver arrives at the selected channel which causes switch 52 to automatically open thereby de-energizing relay 91 and causing contacts 92, 93 to become closed. The closing of contacts 92, 93 applies power from input voltage terminal 95 to the opposite terminal of the clutch solenoid 112 thereby causing it to become energized. The energizing of clutch solenoid 112 instantly applies the rotation of tape drive motor 38 to the tape drive roller 26 as described in conjunction with FIGS. 2 and 3 above. When the tape drive roller 26 begins to rotate, timing wheel 44 also rotates thereby causing the pin 45 to actuate the microswitch 47 through the spring member 46. This causes contacts 102, 103 to open and contacts 103, 104 of the microswitch 47 to become closed. The opening of contacts 102, 103 de-energizes relay 101. However, since contacts 103, 104 of the microswitch 47 remain closed, the tape drive motor 38 and the clutch solenoid 112 remain energized thereby driving the tapes. The tapes continue to drive through their entire length and during this period of time one of the messages which has been pre-recorded upon them is reproduced by the selected and electrically connected tape head 82 and is applied to tape preamplifier 15.

At the same time that clutch solenoid 112 became energized relay 115, which was connected thereacross, is also energized causing contacts 116, 118 thereof to become closed. The closing of contacts 116, 118 of relay 115 permits the pre-recorded message, which has been reproduced by tape head 82 and applied to the tape preamplifier 15 to thus be applied to the television audio amplifier 18 and subsequently to the television speaker 19 thereby informing the viewer that he has selected a particular station. In accordance with the example above given when the rotary arms 57, 58 are in the position indicated in FIG. 4, the message which the viewer hears would inform him, for example, that channel 4 has been selected.

After the predetermined period of time during which the viewer is informed of the particular station selected the timing wheel 44, as illustrated in FIGS. 2 and 3, completes its cycle causing the pin 45 to interconnect with the spring member 46. This connection causes the arm 103, of microswitch 47 as seen in FIG. 4, to disengage contact 104 and re-engage contact 102. The opening of contacts 103, 104 of the microswitch 47 removes the return connection from the tape drive motor 38 and the clutch solenoid 112 thereby de-energizing the tape drive mechanism. At the same time relay 115 is de-energized causing contacts 116, 117 to once again close. When contacts 116, 117 close, the normal audio portion of the television signal is applied to the television speaker and the viewer from that point uninterruptedly enjoys his program.

If, when the listener first hears the particular channel he has selected, he desires to change the television receiver immediately to another channel and instantly reactuates the control button on the hand unit of the remote control for the television receiver, the pre-recorded message is interrupted and the following sequence of operations occur. The contacts of switch 52 close energizing the channel select motor 51 which in turn selects a predetermined station while at the same time the rotary arms 57, 58 of switches 55, 56 respectively and in synchronism with the channel select switch also select a new predetermined tape head. At the same time relay 91 energizes causing contacts 92, 94 to close thereby de-energizing clutch solenoid 112 and relay 115. However, since microswitch 47 contacts 103, 102 are now open, relay 101 does not energize. It should, however, be remembered that contacts 103, 104 of microswitch 47 are closed and therefore tape drive motor 37 is in operation. As soon as the listener allows the channel select switch to remain in a stationary position, the relay 91 is de-energized causing contacts 92, 93 to close thereby re-energizing clutch solenoid 112 and relay 115. Thereafter the remainder of the pre-recorded message which is contained upon the newly selected tape is heard by the viewer over the television speaker 19; this therefore informs the viewer of the new television station which he has selected. It should also be understood that apparatus may be provided for returning the tape to its starting point if the remote control unit is reactuated after the viewer is first informed of the station selected.

Any tape preamplifier which is known to the art may be utilized in conjunction with the circuit above described. Since many such preamplifiers are well known to the prior art no illustration or description, other than the block diagram, will be given in conjunction with the channel indicating apparatus in accordance with the present invention.

There has thus been disclosed an apparatus which automatically indicates the television channel which has been selected by a remote control unit operated by the viewer and which provides an audible indication of the particular television station selected. The automatic station selected indicating apparatus is capable of being incorporated into any existing television receiver, as well as being incorporated in newly manufactured receivers.

What is claimed is:

1. In a television receiver adapted for remote station selection, an apparatus for automatically and audibly indicating the station selected in response to the remote selecion thereof, said apparatus comprising a recording medium containing a plurality of pre-recorded messages each of which is informative of a television station that may be selected, means for reproducing said pre-recorded messages, means for selecting for reproduction a predetermined one of said pre-recorded messages in response to the remote selection of a television station, and means for interrupting the received audio signal from a television station and substituting therefor said one of said pre-recorded messages.

2. In a television receiver adapted for remote station selection, an apparatus for automatically and audibly indicating the station selected in response to the remote selection thereof, said apparatus comprising at least one continuous loop magnetic recording tape having at least one pre-recorded message thereon which is indicative of a television station that may be selected, a tape head in conact with said tape for electrically reproducing said pre-recorded message, means for activating said tape head in response to the remote selection of a television station, and means for interrupting the received audio signal from a television station and substituting therefor said pre-recorded message.

3. In a television receiver adapted for remote station selection, an apparatus for automatically and audibly indicating the station selected in response to the remote selection thereof, said apparatus comprising a continuous loop magnetic recording tape having a plurality of pre-recorded messages thereon each of which is indicative of a television station that may be selected, a tape head in contact with said tape for electrically reproducing one of said plurality of pre-recorded messages at a time, means for selecting said one of said messages to be reproduced in response to the remote selection of a television station, means for moving said tape past said tape head for a predetermined period of time, said time being determined by the length of said tape, means for energizing said tape moving means only after a television station has been selected, and means for de-energizing said tape moving means after said pre-recorded message has been reproduced.

4. In a television receiver adapted for remote station selection, an apparatus for automatically and audibly indicating the station selected in response to the remote selection thereof, said apparatus comprising a continuous loop magnetic recording tape having a plurality of pre-recorded messages thereon each of which is indicative of a television station that may be selected, a plurality of electrically separate tape reproducing heads, one for each of said pre-recorded messages, a pair of switches each having a movable contact and plurality of stationary contacts, each of said electrically separate heads being connected between one of said stationary contacts of each of said pair of switches, means for moving said movable contacts in synchronization with the station select switch of said television receiver, whereby the reproducing head selected coincides with the pre-recorded message indicative of the station selected, means connected between said movable contacts of said switches and the loudspeaker in said television receiver for applying the reproduced pre-recorded message to said loudspeaker, means for moving said tape past said tape head for a predetermined period of time, said time being determined by the length of said tape, means for energizing said tape moving means only after a television station has been selected, and means for de-energizing said tape moving means after said pre-recorded message has been reproduced.

5. In a television receiver adapted for remote station selection, an apparatus for automatically and audibly indicating the station selected in response to the remote selection thereof, said apparatus comprising a continuous loop magnetic recording tape having a plurality of pre-recorded messages thereon each of which is indicative of a television station that may be selected, a tape head in contact with said tape for electrically reproducing one of said plurality of pre-selected recorded messages at a time, a preamplifier, switching means for connecting said reproduced message to said preamplifier, a motor, means for driving said tape, a solenoid clutch for interconnecting said motor and said tape driving means, a first relay for energizing said motor and for conditioning said solenoid to actuate upon energization thereof, said first relay being energized upon the initiation of a remote change of stations within said television receiver, said solenoid being actuated upon the de-energization of said relay, said relay being de-energized after said station has been remotely changed, and a second relay for applying said reproduced message from said preamplifier to the loudspeaker in said television receiver, said second relay being energized only during the time said solenoid is energized.

6. Apparatus according to claim 1 in which said interrupting means is a relay, said relay being energized only during the time said predetermined one of said pre-recorded messages is being reproduced.

7. Apparatus according to claim 3 in which said message selecting means includes a pair of rotary switches synchronized to rotate with a channel select switch in said television receiver and in which rotary switches the stationary contacts are interconnected with said tape head to electrically activate at least a predetermined portion thereof, said predetermined portion being determined by the television station selected.

8. Apparatus according to claim 3 in which said tape moving means includes a clutch and a motor and said means for energizing said tape moving means is a relay, said relay being momentarily energized during the time a channel is being selected to energize said motor, said relay being de-energized after said station is selected to energize said clutch and thereby move said tape, said clutch and said motor being energized for a predetermined period of time after said relay is de-energized, said time being determined by the length of said tape.

9. Apparatus according to claim 3 in which said means for de-energizing said tape moving means is a microswitch, said microswitch being actuated simultaneously with the energization of said tape moving means and de-activated upon the expiration of said predetermined time.

10. Apparatus according to claim 3 in which said tape is two continuous loop magnetic tapes each having a plurality of pre-recorded messages thereon and said tape head is two tape heads each having an electrically individual reproducing section for each pre-recorded message on one of said tapes.

No references cited.